Dec. 8, 1953     NILS-ERIK G. KÜLLER ET AL     2,661,595
HOLDER ASSEMBLY FOR THE PROPELLENT CHARGES IN ROCKET MOTORS
Filed March 19, 1952
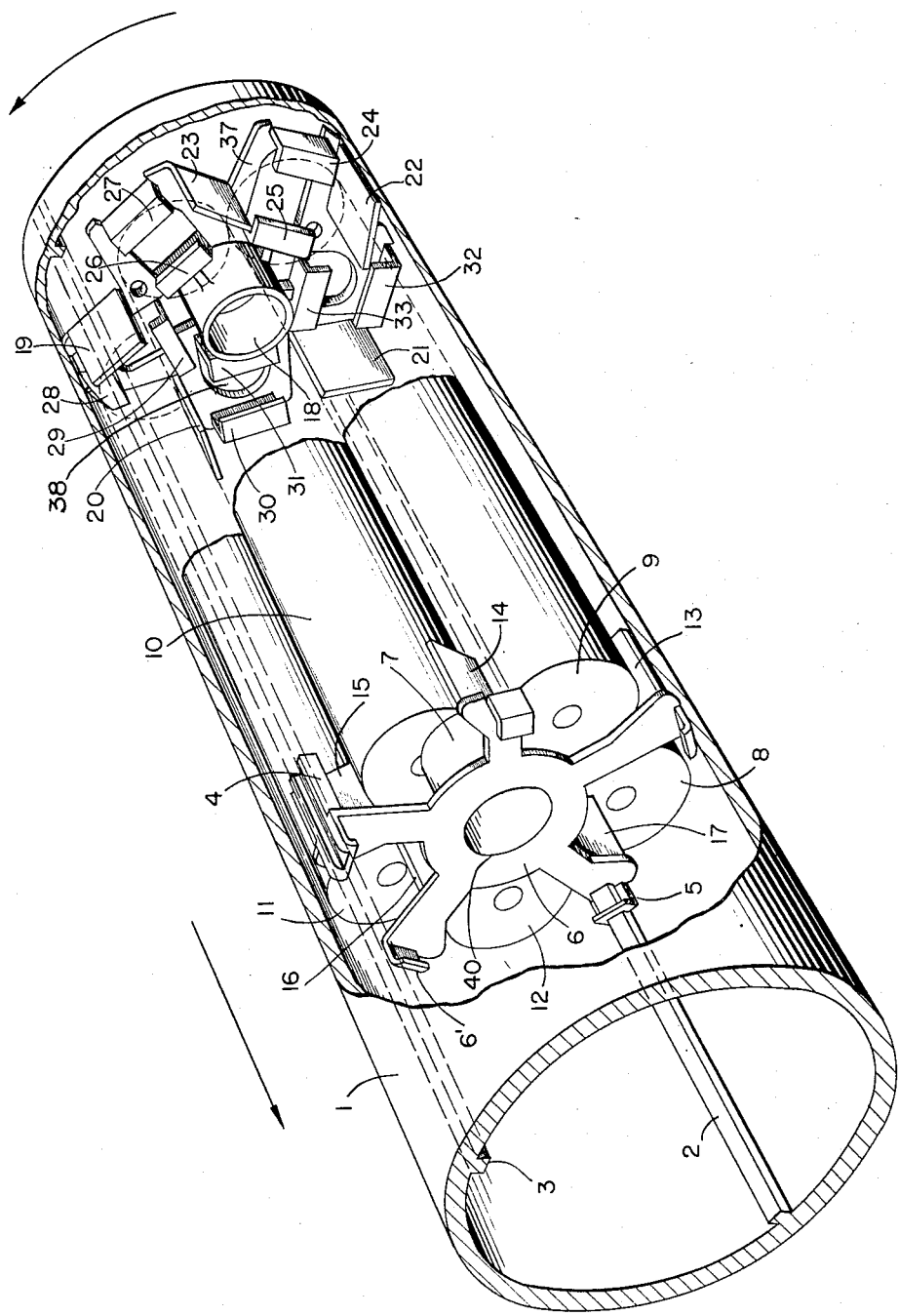
INVENTOR.
NILS-ERIK GUSTAF KÜLLER
KARL-JOHN THORILD THORILDSSON
BY
ATTORNEY

UNITED STATES PATENT OFFICE 2,661,595

HOLDER ASSEMBLY FOR THE PROPELLENT CHARGES IN ROCKET MOTORS

Nils-Erik Gustaf Küller, Karlskoga, and Karl-John Thorild Thorildsson, Bofors, Sweden, assignors to Aktiebolaget Bofors, Bofors, Sweden, a corporation of Sweden Application March 19, 1952, Serial No. 277,346

9 Claims. (Cl. 60—39.47)

This invention relates to rotating rockets, and more particularly to holder assemblies for positioning the propellent charges in the motor chamber of the rocket motor.

One of the problems in the design of rockets of the general type, above referred to, is the avoidance of highly undesirable relative movements between the wall of the motor chamber and the propellent charges which are generally bar-shaped, particularly cylindrically or tube shaped. The relative movements here in question are movements of the charges relative to the periphery of the motor chamber and also movements resulting in a displacement of one end of a charge relative to the other end thereof. The first type of movements is due to forces of inertia, as developed during the flight of the rocket. Relative movements of the second type do not occur until the propellent charges have become thinner, that is, until they have burned for a period of time. When the full charges are freshly installed, they generally occupy substantially the entire available space so that they can move very little if at all, but obviously the available spaces for movements of the charges become larger and larger as the charges are consumed.

Accordingly, the principal object of the present invention is to provide a holder assembly for the propellent charges of a rocket motor which prevents or at least substantially reduces the aforedescribed undesirable relative movements between the charges and the wall of the motor chamber of the rocket motor.

Another object of the invention is to provide a holder assembly which not only prevents or at least reduces the undesirable relative movements of the charges but also acts as a driver upon the anterior end of the charges as seen in the flight direction of the rocket.

Still another object of the invention is to provide an abutment means for the posterior end of the charges which abutment means also forms a grate.

Other and further objects, features and advantages of the invention will be pointed out hereinafter and set forth in the appended claims forming part of the application.

In the accompanying drawing, the single figure shows a now preferred embodiment of the invention by way of illustration and not by way of limitation.

In the illustrated exemplification of the invention only those parts of the rocket motor are shown that are believed to be essential for the understanding of the invention.

The exemplified rocket motor comprises a motor chamber 1 of substantially cylindrical configuration. The motor chamber is provided on its inside wall with one or more longitudinal ribs of suitable length, two ribs 2 and 3 being shown. The ribs serve to guide the driving means of the rocket motor in axial direction and to prevent a rotation of the driving means in peripheral direction. The driving means are shown as comprising a substantially disc or plate shaped member in form of a substantially circular center portion from which a number of arms, say five, radiate. Two of these arms support shoes 4 and 5 slidably engaging ribs or rails 2 and 3. The three other arms of driving member 6 are bent off at a right angle to the general plane of the driving member so as to form guide flanges 6' with which the driving member is additionally guided along the inner wall of motor chamber 1. The circular center portion of the driving member has a hole 40 therethrough and supports a tube 7 of approximately the same diameter as hole 40. This tube serves, among other purposes which are not essential for the understanding of the invention, to assist in the positioning of the propellent charges. These charges are shown in form of cylindrical tubes 8 to 12 inclusive. The direction of flight of the rocket is indicated by an arrow, and the driving member abuts with its posterior side against the anterior ends of the charges. The driving member further supports a plurality of guide plates 13 to 17 inclusive, one for each charge. These plates are preferably rectangularly shaped and extend in axial and radial directions. They are preferably disposed so that each abuts against one of the charges in a tangential plane relative to the periphery of the respective charge and forms with a corresponding portion of the inner wall of motor chamber 1 with which the charge is in contact, an obtuse angle assuming that the respective chamber wall portion would be plane. The plates are further so positioned that the outer axial edge of each plate is closely adjacent to the inner wall of motor chamber 1. As a result, the anterior ends of the charges will each be nested in a V-shaped pocket. Each plate is preferably extended in radial direction so that its inner axial edge is closely adjacent to the next adjacent charge when the same has its full initial thickness. In other words, each charge with the periphery of which a plate forms a tangent may be referred to as the preceding propelling charge and the adjacent charge is the succeeding charge, for instance charge 10 is the charge preceding charge 9.

The opposite or posterior ends of the charges abut against an abutment means. This abutment means may be arranged in the same manner as the driving means just described but with the difference that the abutment means must be stationarily mounted relative to the motor chamber. The plates of the abutment means corresponding to discs 13 to 17 of the driving means should of course be disposed in alignment with the corresponding plates of the driving means. However, it has been found preferable to provide an abutment means as is shown on the drawing. This abutment means is so designed that it can function as a grate as can also the plate member 6.

The abutment means comprises a substantially plane member 37 formed with circumferentially spaced holes 38 and a center hole from which extends a tube 18 of a diameter equal to the diameter of the center hole. As can be clearly seen on the figure, a plurality of pairs of flanges 24, 25; 26, 27; 28, 29; 30, 31; and 32, 33 respectively are bent out of the material of member 37. Each of these flanges comprises a portion parallel to the longitudinal axis of motor chamber 1 and a radially bent-off end portion. These bent-off end portions serve as abutting surfaces for the posterior ends of the charges and also form together with the holes 38 in member 37 the aforementioned grate. The abutment means further comprises a plurality of plates 19 to 23 inclusive, one for each charge. These plates are arranged in a manner as has been described in connection with plates 13 to 17 inclusive and serve to prevent peripheral displacements of the rear ends of the charges by forming together with the adjacent wall portions of the motor chamber, V-shaped pockets in which the posterior charge ends are nested.

Rocket motors of the type here in question may be equipped with one or more nozzles. In the present case, it should be visualized that several nozzles are provided and that the same are set at an angle.

Let it now be assumed that a rocket motor with a holder assembly as just described is placed in a rocket and that the nozzles of the motors are so set that upon the development of driving gas the rocket motor will be rotated in a direction which coincides with the direction from each successive propellent charge to the preceding propellent charge. Then, the axial plates of the two holders will cause a rotation of the propellent charges as they are stationary in the direction of the rotation relative to the wall of the motor chamber of the rocket motor. Consequently, the propellent charges cannot move relative to the wall of the chamber of the rocket motor in the direction of rotation. Furthermore, the ends of the propellent charges and, hence, the entire propellent charges will be strongly pressed into the aforementioned pockets by the centrifugal force. It will also be apparent that the ends of the charges will be continuously pressed into the pockets in spite of the continuous decrease of the diameter of the rockets due to consumption of the charge material by the combustion. The propellent charges will also remain parallel to the axis of the motor chamber because during the flight of the rocket the force of acceleration always drives the driving member 6 toward the abutment means or, in other words, the charges are continuously pressed against the abutment means.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A holder assembly for positioning bar-shaped propellent charges in a rotating rocket motor, the said assembly comprising a motor chamber, a retaining member for each charge to be placed in the motor chamber extending parallel to a charge therein and secured against displacement relative to the periphery of the wall of the motor chamber so as to form together with said wall a pocket preventing a peripheral movement of the respective charge relative to the motor chamber, abutment means fixedly mounted within the motor chamber and forming an abutment for one end of charges placed in the motor chamber thereby preventing an axial displacement of the charges in the direction of the abutment means, and driving means disposed within the motor chamber juxtaposedly to the other end of charges placed in the motor chamber and mounted axially slidable for pressing the charges toward the abutment means in response to a force tending to move the driving means toward the abutment means.

2. A holder assembly for positioning bar-shaped propellent charges in a rotating rocket motor, the said assembly comprising a substantially tubular motor chamber, abutment means fixedly mounted within the motor chamber and positioned to form an abutment for the posterior ends of charges placed in the motor chamber as seen in the flight direction of the rocket thereby preventing an axial displacement of charges in the direction opposite to the flight direction of the rocket, driving means mounted axially slidable within the motor chamber and secured against rotation relative to the periphery of the wall of the motor chamber, the said driving means being positioned adjacent to the anterior end of charges placed in the motor chamber thereby pressing the said charges toward the abutment means during the flight of the rocket, and a retaining means for each charge positioned within the motor chamber so as to extend toward the center axis of the motor chamber and to form together with an adjacent wall portion of the motor chamber a pocket for the respective charge preventing a peripheral displacement of the charges relative to the motor chamber.

3. A holder assembly for positioning bar-shaped propellent charges in a rotating rocket motor, the said assembly comprising a substantially tubular motor chamber, abutment means fixedly mounted within the motor chamber and positioned to form an abutment for the posterior ends of charges placed in the motor chamber as seen in the flight direction of the rocket thereby preventing an axial displacement of charges in the direction opposite to the flight direction of the rocket, driving means mounted axially slidable within the motor chamber and secured against rotation relative to the periphery of the wall of the motor chamber, the said driving means being positioned adjacent to the anterior end of the charges placed in the motor thereby pressing the said charges toward the abutment means during the flight of the rocket, and a retaining plate for each charge secured to the driving means and axially extending toward the abutment means and radially toward the center axis of the motor chamber, each of the said plates conjointly with the adjacent chamber wall portion forming a pocket for one of the charges preventing a peripheral displacement of a charge nested in the pocket relative to the motor chamber.

4. A holder assembly as defined in claim 3, wherein each of the said retaining plates is disposed substantially tangentially to the periphery of a charge nested in a pocket.

5. A holder assembly as defined in claim 4, wherein the said plates are rectangularly shaped, the outer axial edge of each plate being disposed closely adjacent to the inner wall surface of the motor chamber and the inner axial edge of each plate being disposed closely adjacent to the periphery of a full charge nested in an adjacent pocket.

6. A holder assembly as defined in claim 2, wherein the said driving means are in form of a grate.

7. A holder assembly as defined in claim 2, wherein the said fixedly mounted abutment means are in form of a grate.

8. A holder assembly as defined in claim 7, wherein the said abutment means are substantially plate-shaped and formed with a plurality of guide flanges extending toward the driving means and positioned to abut against the peripheries of charges placed in the motor chamber, the said plate-shaped abutment means including a plurality of apertures forming the said grate.

9. A holder assembly as defined in claim 2, wherein the said driving means are axially guided by grooves and ribs engaging each other and formed on the driving means and the inner wall of the motor chamber respectively.

NILS-ERIK GUSTAF KÜLLER.
KARL-JOHN THORILD THORILDSSON.

References Cited in the file of this patent

UNITED STATES PATENTS

| Number | Name | Date |
|---|---|---|
| 2,489,953 | Burney | Nov. 29, 1949 |

FOREIGN PATENTS

| Number | Country | Date |
|---|---|---|
| 922,209 | France | Jan. 27, 1947 |
| 976,391 | France | Oct. 25, 1950 |